US012347596B2

(12) United States Patent
Oide et al.

(10) Patent No.: US 12,347,596 B2
(45) Date of Patent: Jul. 1, 2025

(54) MULTI-LAYER INDUCTOR

(71) Applicant: TDK Corporation, Tokyo (JP)

(72) Inventors: Akihiko Oide, Tokyo (JP); Makoto Yoshino, Tokyo (JP); Tomoki Okada, Yurihonjo (JP); Seiji Osada, Yurihonjo (JP); Yuuki Okazaki, Yurihonjo (JP); Takeshi Sasaki, Yurihonjo (JP); Mitsuru Ito, Yurihonjo (JP); Kenta Sasaki, Yurihonjo (JP); Kazuhiro Ebina, Tokyo (JP); Takashi Abe, Yurihonjo (JP); Hiroshi Ono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 678 days.

(21) Appl. No.: 17/697,212

(22) Filed: Mar. 17, 2022

(65) Prior Publication Data

US 2022/0310299 A1 Sep. 29, 2022

(30) Foreign Application Priority Data

Mar. 23, 2021 (JP) ................................ 2021-049136

(51) Int. Cl.
*H01F 17/00* (2006.01)
*H01F 27/28* (2006.01)
*H01F 27/29* (2006.01)

(52) U.S. Cl.
CPC ..... *H01F 17/0006* (2013.01); *H01F 27/2847* (2013.01); *H01F 27/292* (2013.01); *H01F 2017/0066* (2013.01); *H01F 2017/0073* (2013.01)

(58) Field of Classification Search
CPC ............. H01F 17/0006; H01F 27/2847; H01F 27/292; H01F 2017/0066; H01F 2017/0073
See application file for complete search history.

(56) References Cited

U.S. PATENT DOCUMENTS 4,538,132 A * 8/1985 Hiyama .............. H01F 27/2804 336/232
8,174,348 B2 * 5/2012 Ikriannikov .......... H01F 27/292 336/200
8,674,802 B2 * 3/2014 Ikriannikov ............ H02M 3/02 336/170
9,171,665 B2 * 10/2015 Silva ..................... H01F 27/306
10,381,148 B2 * 8/2019 Chida ..................... H01F 27/22
(Continued)

FOREIGN PATENT DOCUMENTS

JP S59-072708 U 5/1984
JP 11040426 A * 2/1999
(Continued)

*Primary Examiner* — Malcolm Barnes
(74) *Attorney, Agent, or Firm* — Oliff PLC

(57) ABSTRACT

In the multi-layer inductor, the internal electrode includes the auxiliary conductor, and the auxiliary conductor is jointed to the external electrode at the end face. Therefore, when a defect occurs in a part of the through conductors, a current flows through the remaining through conductor(s) and a current also flows through the auxiliary conductor. Therefore, overheating at the joint surface between the remaining through conductor(s) and the external electrode can be prevented, and cutting and/or fusion starting from the joint surface can be prevented.

7 Claims, 10 Drawing Sheets

(56) References Cited

U.S. PATENT DOCUMENTS

| | | | | |
|---|---|---|---|---|
| 2010/0039200 | A1* | 2/2010 | Yan | H01F 17/04<br>336/147 |
| 2012/0188028 | A1* | 7/2012 | Togashi | H01F 17/0006<br>336/200 |
| 2020/0176170 | A1* | 6/2020 | Terauchi | H01F 27/2804 |

FOREIGN PATENT DOCUMENTS

| | | | | |
|---|---|---|---|---|
| JP | 2000068130 | A | * | 3/2000 |
| JP | 2012-156192 | A | | 8/2012 |

* cited by examiner

MULTI-LAYER INDUCTOR

CROSS-REFERENCE TO RELATED APPLICATIONS

This application is based upon and claims the benefit of priority from Japanese Patent Application No. 2021-49136, filed on 23 Mar. 2021, the entire contents of which are incorporated herein by reference.

TECHNICAL FIELD

The present disclosure relates to a multi-layer inductor.

BACKGROUND

Known in the art is an inductor including a through conductor linearly extending in an element body. Japanese Utility Model Application Laid-Open No. 1984-72708 discloses an inductor including an element body having a pair of end surfaces facing each other, three through conductors extending between the end surfaces, and a pair of external electrodes provided on both the end surfaces of the element body and connected to the respective through conductors.

SUMMARY

As in the inductor according to the conventional art described above, in a case where the through conductors are formed into a multiple line (that is, a current flows through each of the plurality of through conductors connected in parallel), a current in a prescribed current value range flows through each of the plurality of through conductors. When a failure such as disconnection occurs in a part of the through conductors, a current exceeding a prescribed current value range (i.e., overcurrent) flows in the remaining through conductors. In this case, the joint surface between the through conductor and the external electrode, which is a region having a relatively high electrical resistance, is overheated, and cutting and/or fusion from the joint surface may occur.

According to an aspect of the present disclosure, a multi-layer inductor with improved reliability is provided.

A multi-layer inductor includes, an element body including a plurality of magnetic material layers stacked and having a pair of end surfaces facing each other, an internal electrode provided in the element body and extending between the pair of end surfaces; and a pair of external electrodes respectively provided on the end surfaces of the element body and connected to the internal electrode exposed on the end surfaces, wherein the internal electrode includes, a plurality of through conductors extending between the end surfaces along a direction in which the pair of end surfaces face each other and having end portions exposed at the end surfaces, and an auxiliary conductor extending between ends of the plurality of through conductors and is exposed at the end surface.

Since the multi-layer inductor includes the auxiliary conductor connected to the external electrode at the end surface of the element body, even when a failure occurs in a part of the through conductor, overheating at the joint surface between the internal electrode and the external electrode is prevented, and cutting and/or fusion starting from the joint surface is prevented. Therefore, high reliability can be achieved.

In the multi-layer inductor according to another aspect, the internal electrode is located in one interlayer of the plurality of magnetic material layers.

In the multi-layer inductor according to another aspect, the internal electrode is located in a plurality of interlayers of the plurality of magnetic material layers.

In the multi-layer inductor according to another aspect, the plurality of through conductors include a pair of through conductors arranged along a stacking direction of the element body.

In the multi-layer inductor according to another aspect, the plurality of through conductors include, a first through conductor and a second through conductor located in the same interlayer of the plurality of magnetic material layers; and a third through conductor and a fourth through conductor located in the same interlayer different from the interlayer in which the first through conductor and the second through conductor are located and aligned with the first through conductor and the second through conductor, respectively, in the stacking direction of the element body.

In the multi-layer inductor according to another aspect, a length of the auxiliary conductor in a first direction orthogonal to a stacking direction of the element body and a facing direction of the pair of end surfaces are 20 to 50% of a length of the element body in the first direction.

In the multi-layer inductor according to another aspect, a length of the auxiliary conductor in a second direction parallel to a direction in which the pair of end surfaces face each other are 2% to 20% of a length of the element body in the second direction.

DETAILED DESCRIPTION

Figure 1:
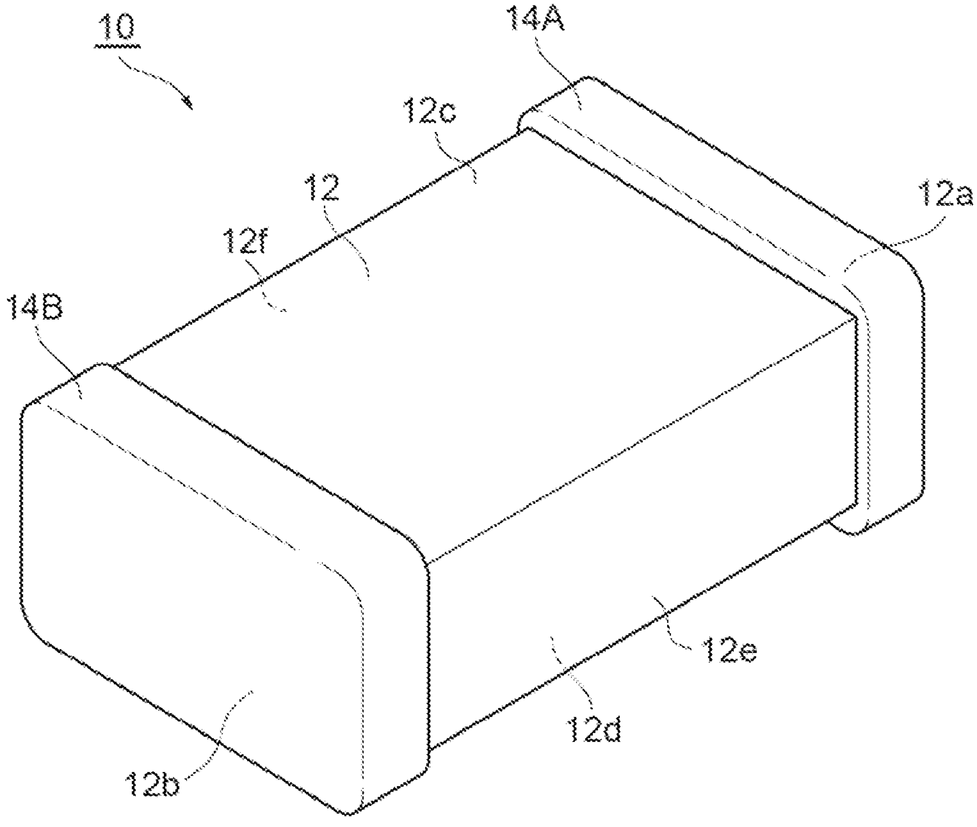
FIG. 1 is a perspective view showing a multi-layer inductor according to an embodiment.

Hereinafter, embodiments for carrying out the present disclosure will be described with reference to the accompanying drawings. In the description of the drawings, the same or equivalent elements are denoted by the same reference numerals, and redundant description will be omitted.

The configuration of a multi-layer inductor according to an embodiment will be described with reference to FIGS. 1 to 4. As shown in FIG. 1, the multi-layer inductor 10 according to the embodiment includes an element body 12 and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the facing direction of the end surface 12*a* and 12*b* to connect the end surfaces 12*a* and 12*b* to each other. The side surface 12*d* is a mounting surface facing the mounting substrate when the multi-layer inductor 10 is mounted, and the side surface 12*c* facing the side surface 12*d* is a top surface when the multi-layer inductor 10 is mounted. The dimensions of the element body 12 are, for example, 2.5 mm length×2 mm width×0.9 mm thickness, where a dimension in the facing direction of the end faces 12*a* and 12*b* is a length (L), a dimension in the facing direction of the side faces 12*e* and 12*f* is a width (W), and a dimension in the facing direction of the side faces 12*c* and 12*d* is a thickness.

Figure 4:
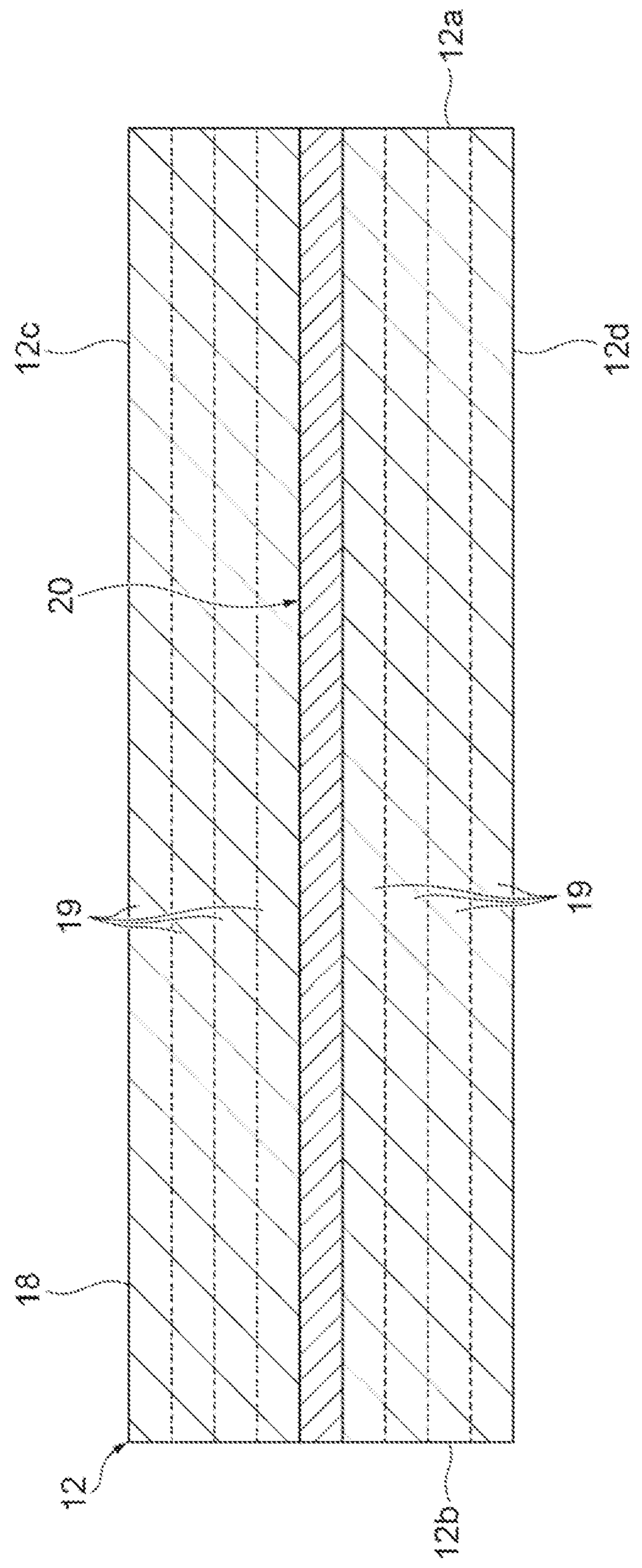
FIG. 4 is a cross-sectional view taken along line IV-IV of the element body shown in FIG. 2.

The element body 12 has a configuration in which an internal electrode 20 is provided inside a magnetic body 18. As shown in FIG. 4, the element body 12 has a stacking structure in which a plurality of magnetic material layers 19 constituting the magnetic body 18 are stacking in the facing direction of the side surfaces 12*c* and 12*d*. In the following description, the facing direction of the side surfaces 12*c* and 12*d* is also referred to as a stacking direction of the element body 12.

The magnetic body 18 is made of a magnetic material such as ferrite. The magnetic body 18 is obtained by stacking and sintering a plurality of magnetic body pastes (for example, ferrite pastes) that become the magnetic material layers 19. That is, the element body 12 has a printed stacking structure in which the magnetic material layers 19 on which the magnetic material paste is printed are stacking, and is a sintered element body in which the sintered magnetic material layers 19 are stacked. The number of magnetic material layers 19 constituting the element body 12 is, for example, 150. In the actual element body 12, the plurality of magnetic material layers 19 are integrated to such an extent that the boundaries between the layers cannot be visually recognized.

Figure 2:
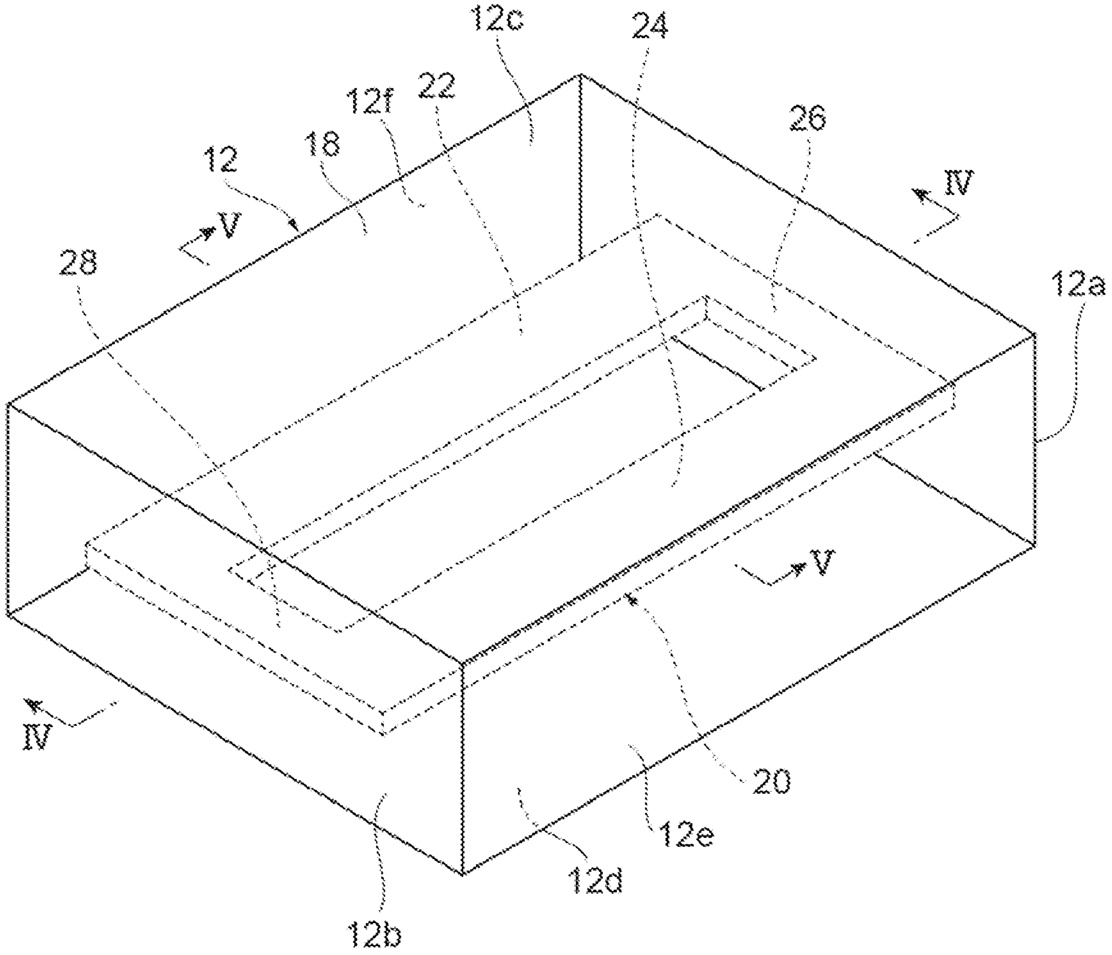
FIG. 2 is a perspective view showing internal electrodes of the element body shown in FIG. 1.
Figure 3:
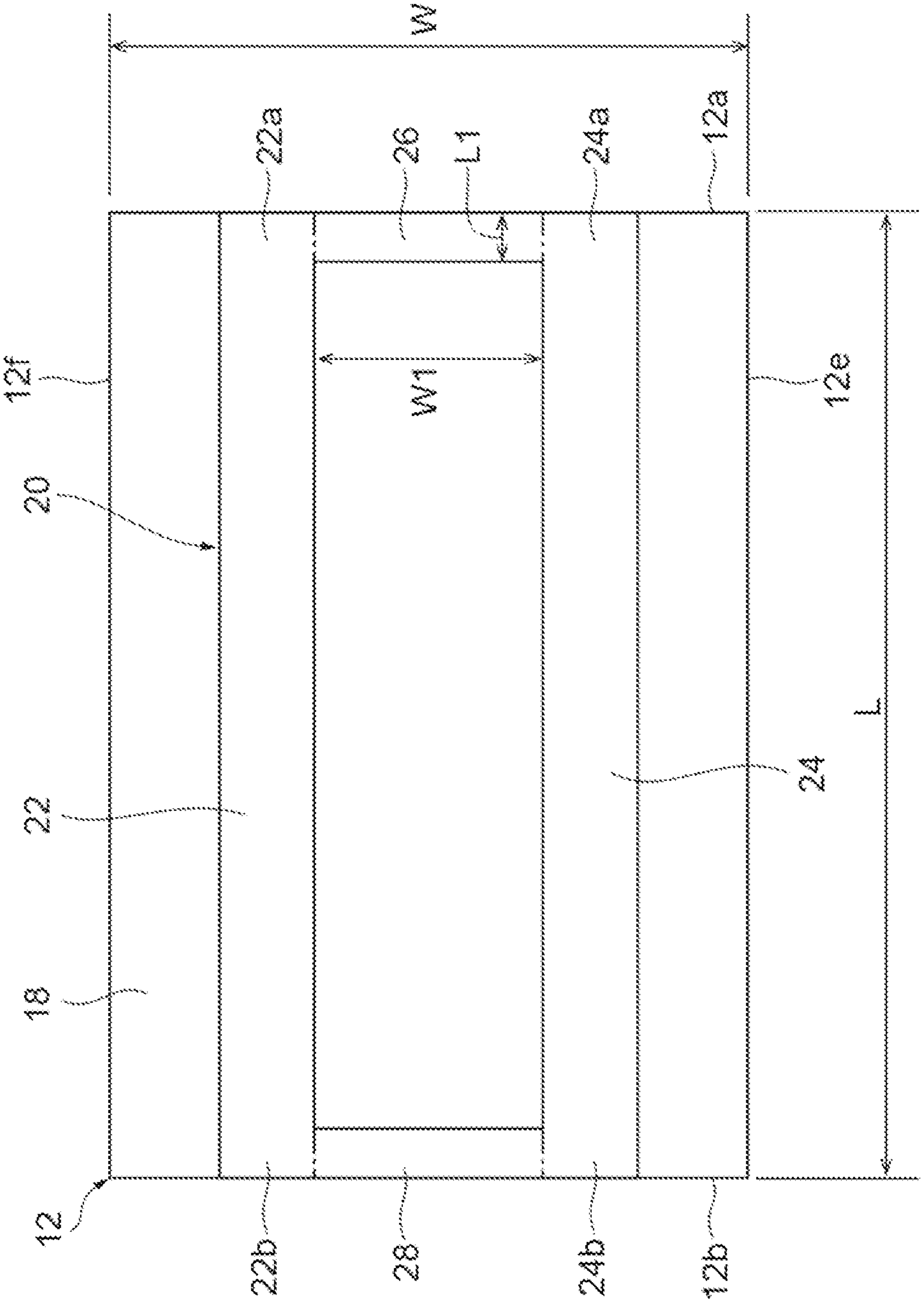
FIG. 3 is a plan view of the internal electrode shown in FIG. 2.

As shown in FIGS. 2 and 3, the internal electrode 20 extends between the pair of end surfaces 12*a* and 12*b*. In addition, as shown in FIG. 4, the entire internal electrode 20 is located in one interlayer of the plurality of magnetic material layers 19. The internal electrodes 20 are made of a conductive material containing a metal such as Ag. The internal electrode 20 is formed by a printing method. Specifically, the internal electrode 20 is obtained by applying a conductive paste (for example, Ag paste) to be the internal electrode 20 on a magnetic paste to be the magnetic material layers 19 and sintering the conductive paste.

The internal electrode 20 includes a pair of through conductors 22 and 24 extending along the facing direction of the end surfaces 12*a* and 12*b*. The through conductors 22 and 24 extend between the end surfaces 12*a* and 12*b* (i.e., from the end surface 12*a* to the end surface 12*b* of the element body 12). The through conductor 22 has an end portion 22*a* on the end surface 12*a* side and an end portion 22*b* on the end surface 12*b* side, and similarly, the through conductor 24 has an end portion 24*a* on the end surface 12*a* side and an end portion 24*b* on the end surface 12*b* side. The through conductor 22 is exposed to the end surface 12*a* at the end portion 22*a*, and is exposed to the end surface 12*b* at the end portion 22*b*. Similarly, the through conductor 24 is exposed to the end surface 12*a* at the end portion 24*a*, and is exposed to the end surface 12*b* at the end portion 24*b*.

Figure 5:
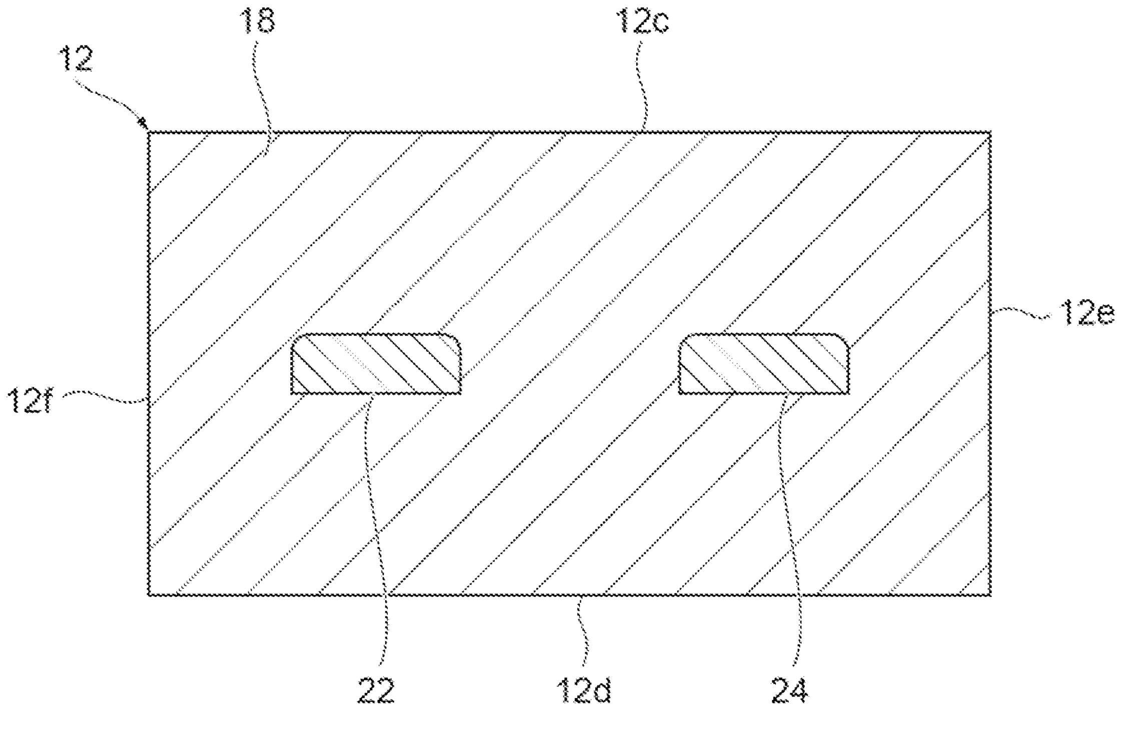
FIG. 5 is a cross-sectional view taken along line V-V of the element body shown in FIG. 2.

In the present embodiment, each of the through conductors 22 and 24 has a slip shape having a uniform width and a uniform height. As shown in FIG. 5, each of the through conductors 22 and 24 according to the present embodiment has a cross-sectional shape of a cross section orthogonal to the facing direction of the end surfaces 12*a* and 12*b*, in which two corners on the side far from the mounting surface among four corners of a rectangle extending parallel to the mounting surface (side surface 12*c*) are rounded (so-called semicylindrical cross-section). The cross-sectional shape of each of the through conductors 22 and 24 may be a rectangular shape extending parallel to the mounting surface, or may be a semi-elliptical shape in which the mounting surface side is flat. In the present embodiment, each of the through conductors 22 and 24 has a uniform width and a uniform height over the entire length. In the present embodiment, the through conductors 22 and 24 have the same dimensions, for example, 2.5 mm length×0.4 mm width×0.1 mm thickness.

The internal electrode 20 further includes a pair of auxiliary conductors 26 and 28. The auxiliary conductor 26 extends between the end portion 22*a* of the through conductor 22 and the end portion 24*a* of the through conductor 24. The auxiliary conductor 28 extends between the end portion 22*b* of the through conductor 22 and the end portion 24*b* of the through conductor 24. The auxiliary conductors 26 and 28 are provided integrally with the pair of through conductors 22 and 24. The auxiliary conductors 26 and 28 extend along the end surfaces 12*a* and 12*b* and are exposed to the end surfaces 12*a* and 12*b* over the entire length in the widthwise direction (the facing direction of the side surfaces 12*e* and 12*t*) of the element body 12. In the present embodiment, each of the auxiliary conductors 26 and 28 has a slip shape extending in the widthwise direction of the element body 12, and has a uniform width and a uniform height. In the present embodiment, the auxiliary conductors 26 and 28 have the same dimensions, for example, 0.1 mm length×0.4 mm width×0.1 mm thickness. The lengths of the auxiliary conductors 26 and 28 may be in the range of 0.1 to 1.0 mm.

The pair of external electrodes 14A and 14B are provided on the end surfaces 12*a* and 12*b* of the element body 12, respectively. The external electrode 14A covers the entire region of the end surface 12*a*, and is jointed in direct contact with the through conductors 22 and 24 and the auxiliary conductor 26 of the internal electrode 20 exposed to the end surface 12*a*. Similarly, the external electrode 14B covers the entire region of the end surface 12*b*, and is jointed in direct contact with the through conductors 22 and 24 and the auxiliary conductor 28 of the internal electrode 20 exposed to the end surface 12*b*. In the present embodiment, as shown in FIG. 1, the external electrodes 14A and 14B integrally cover the end surfaces 12*a* and 12*b* and the side surfaces 12*c* to 12*f* of the region adjacent to the end surfaces 12*a* and 12*b*.

Figure 6:
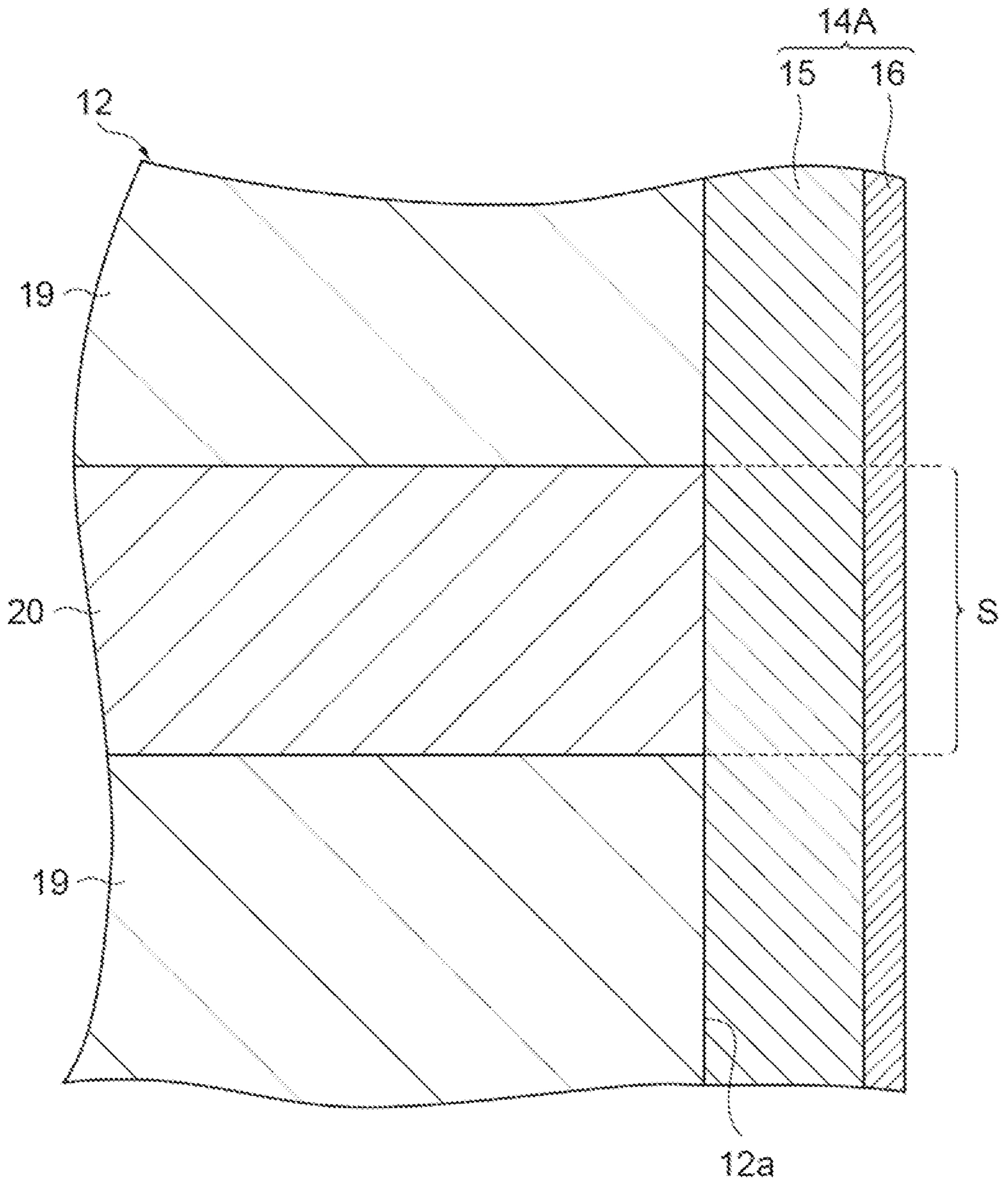
FIG. 6 is a cross-sectional view showing a joint state between the internal electrode and the external electrode.

Each of the external electrodes 14A and 14B is formed of one or more electrode layers. A metallic material such as Ag, for example, can be adopted as an electrode material constituting each of the external electrodes 14A and 14B. In the present embodiment, as shown in FIG. 6, each of the external electrodes 14A and 14B is composed of two electrode layers 15 and 16. The first electrode layer 15 is a layer located on the element body 12 side and directly covers the end surfaces 12*a* and 12*b*. The first electrode layer 15 is composed of a sintered electrode containing Ag and glass or a resinous electrode. The second electrode layer 16 is a layer located on the outer side and entirely covers the surfaces of the first electrode layer 15. The second electrode layer 16 is formed of a plated electrode. The second electrode layer 16 can be constituted by a plurality of plating layers, and can be constituted by three layers (Cu/Ni/Sn) or two layers (Ni/Sn, Ni/Au).

Figure 7:
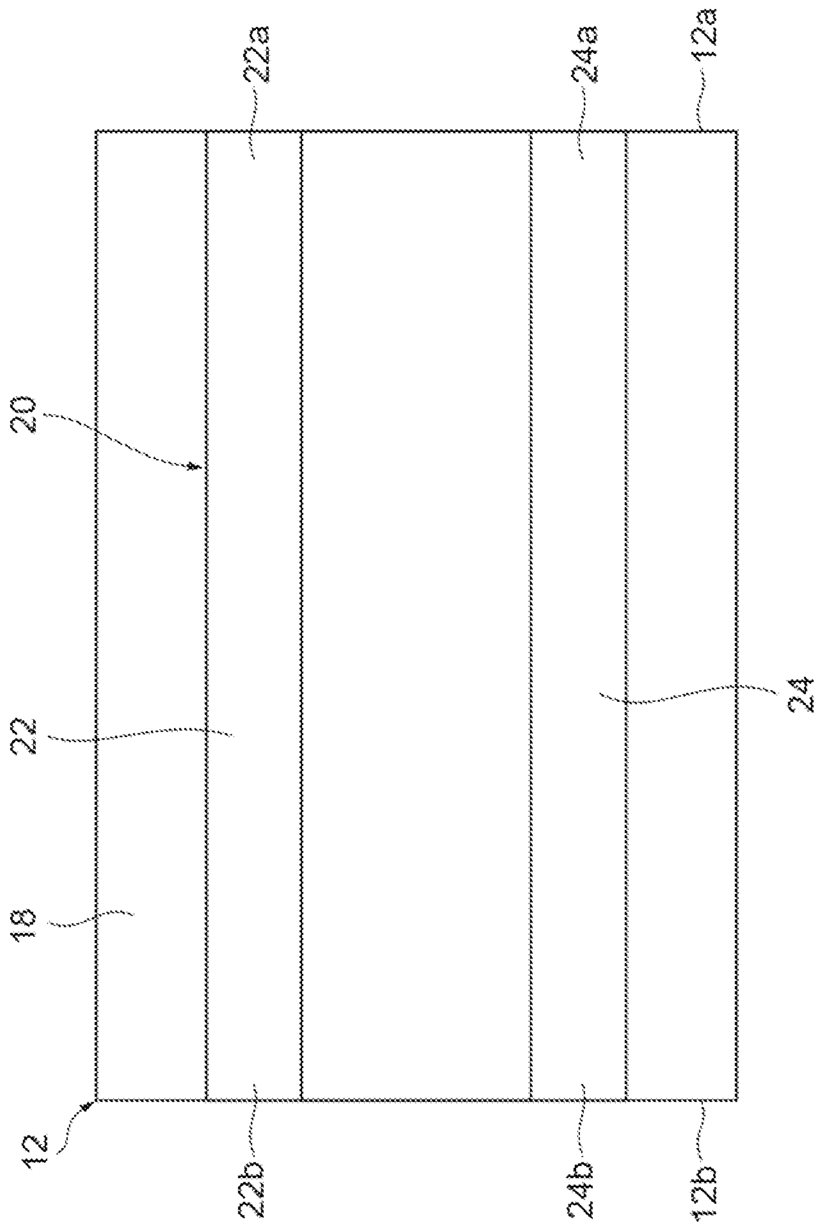
FIG. 7 is a plan view showing internal electrodes with a form different from that of FIG. 4.

FIG. 7 shows the element body 12 including the internal electrode 20 that does not include the auxiliary conductors 26 and 28 described above. The through conductors 22 and 24 constituting the internal electrode 20 of FIG. 7 are jointed to the external electrodes 14A and 14B at the end surfaces 12*a* and 12*b*. In the element body 12 shown in FIG. 7, a joint surface S (see FIG. 6) between the internal electrodes 20 and the external electrodes 14A and 14B is a region having relatively high electric resistance, and the joint surface S is likely to be overheated when a predetermined current flows between the external electrodes 14A and 14B. In particular, when a defect such as disconnection occurs in one through conductor (for example, the through conductor 22), a current for two through conductors flows in the other through conductor (for example, the through conductor 24). As a result, the joint surface S between the other through conductor and the external electrodes 14A and 14B is overheated, and cutting and/or fusion from the joint surface S as a starting point may occur. The disconnection of the through conductor may be caused by, for example, bending or twisting of the through conductor due to internal stress.

In the multi-layer inductor 10 according to the present embodiment, as shown in FIG. 3, the internal electrode 20 includes auxiliary conductors 26 and 28, and the auxiliary conductors 26 and 28 are jointed to the external electrodes 14A and 14B at the end surfaces 12*a* and 12*b*. That is, in the end surfaces 12*a* and 12*b*, the through conductors 22 and 24 of the internal electrode 20 are jointed to the external electrodes 14A and 14B, and the auxiliary conductors 26 and 28 of the internal electrode 20 are also joined to the external electrodes 14A and 14B. Therefore, when a defect occurs in a part of the through conductors, a current flows through the remaining through conductor(s) and a current also flows through the auxiliary conductor. As a result, overheating at the joint surface S of the remaining through conductor(s) and the external electrodes 14A and 14B can be prevented, and cutting and/or fusing starting from the joint surfaces S can be prevented. Therefore, high reliability is achieved in the multi-layer inductor 10.

In addition, since the joint surface S between the internal electrode 20 and the external electrodes 14A and 14B is enlarged, high connectivity between the internal electrode 20 and the external electrodes 14A and 14B is realized, and a situation in which the internal electrode 20 and the external electrodes 14A and 14B peel off is effectively prevented.

Furthermore, the lengths W 1 of the auxiliary conductors 26 and 28 in the widthwise direction (first direction) of the element body 12 may be 20 to 50% of the length W of the element body 12 in the first direction.

The lengths L1 of the auxiliary conductors 26 and 28 in the facing direction of the end surfaces 12*a* and 12*b* (second direction) may be 2 to 20% of the length L of the element body 12 in the second direction.

Figure 8:
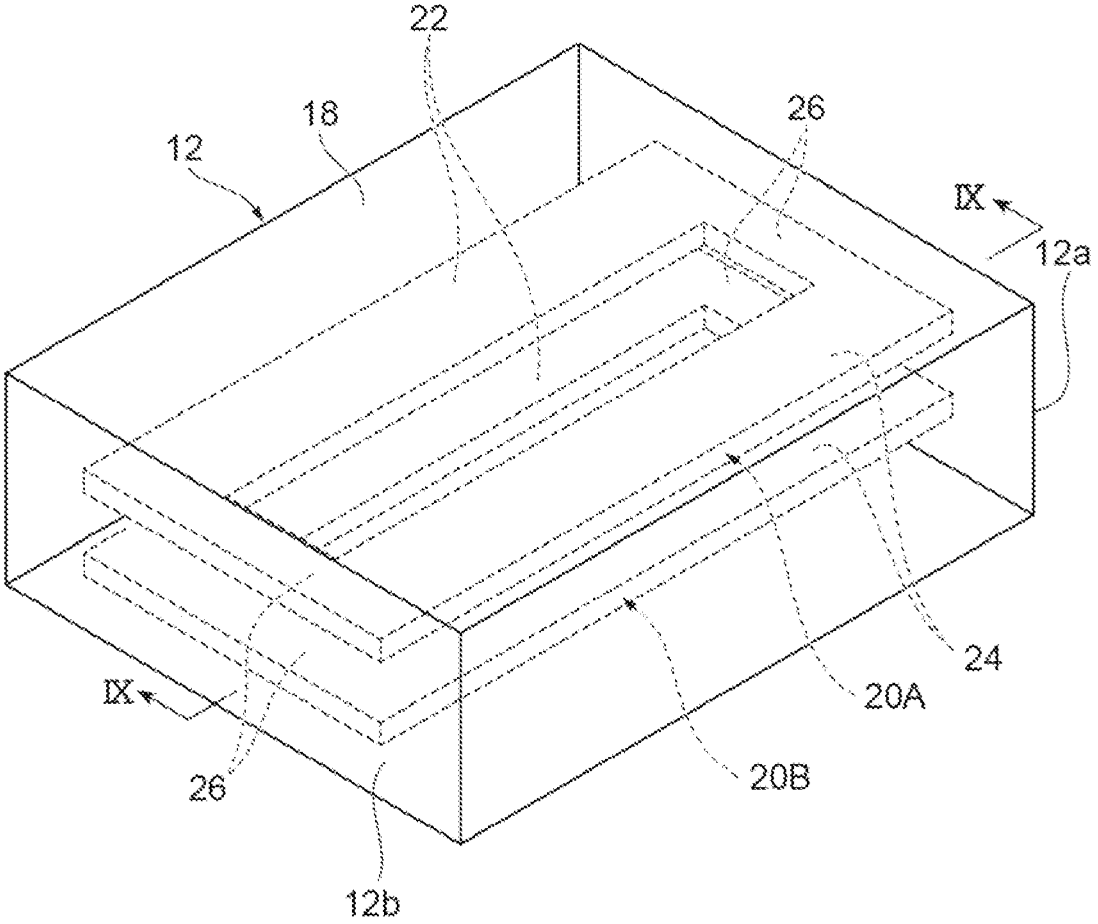
FIG. 8 is a perspective view showing internal electrodes with a form different from that of FIG. 2.

The internal electrode 20 described above may include a plurality of internal electrodes 20A and 20B as shown in FIG. 8. In this case, the two internal electrodes 20A and 20B shown in FIG. 8 are located between two different interlayers of the plurality of magnetic material layers 19 as shown in FIG. 8. Each of the internal electrodes 20A and 20B has the same shape and dimensions as those of the internal electrode 20 described above, and includes through conductors 22 and 24 and auxiliary conductors 26 and 28. Therefore, the through conductor 22 (first through conductor) of the internal electrode 20A and the through conductor 22 (third through conductor) of the internal electrode 20B are arranged along the stacking direction of the element body 12. Similarly, the through conductor 24 (second through conductor) of the internal electrode 20A and the through conductor 24 (fourth through conductor) of the internal electrode 20B are arranged along the stacking direction of the element body 12.

Figure 9:
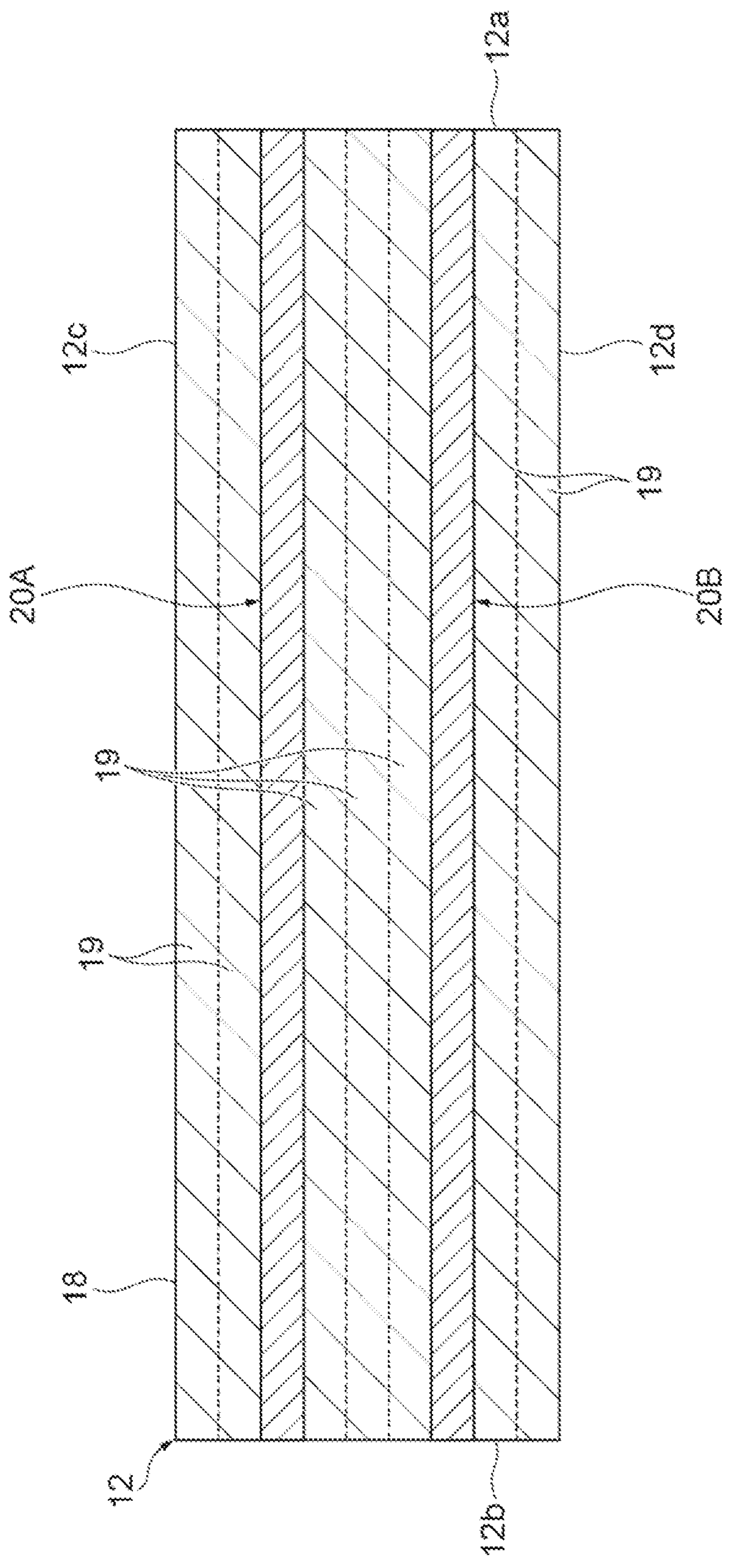
FIG. 9 is a cross-sectional view taken along line IX-IX of the element body shown in FIG. 8.

Also in the configurations shown in FIGS. 8 and 9, when a defect occurs in a part of the through conductors, a current flows through the remaining through conductor(s) and a current also flows through the auxiliary conductors. Therefore, overheating at the joint surfaces S of the internal electrodes 20A and 20B and the external electrodes 14A and 14B can be prevented, and cutting and/or fusion starting from the joint surfaces S can be prevented.

Figure 10:
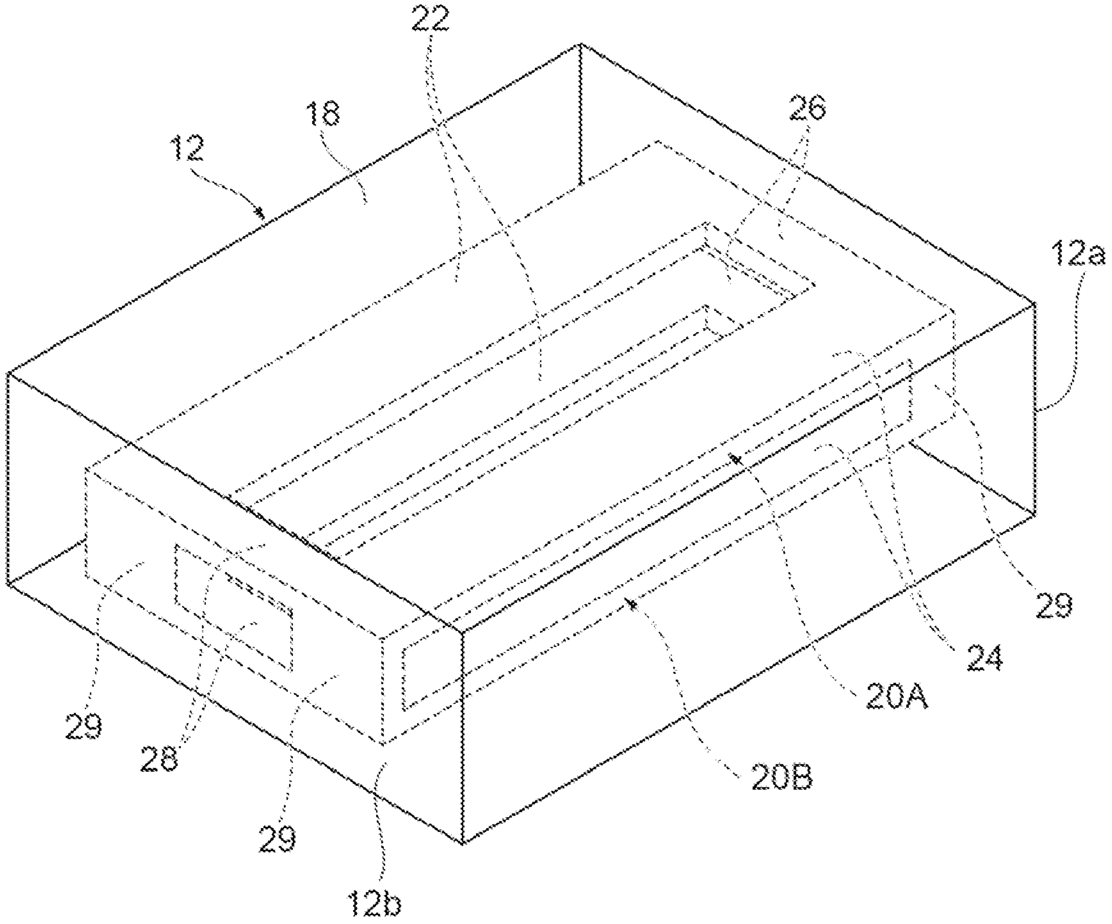
FIG. 10 is a perspective view showing internal electrodes with a form different from that of FIG. 8.

As shown in FIG. 10, auxiliary conductors 29 extending along the end surfaces 12*a* and 12*b* between the end portions 22*a* and 22*b* of the through conductors 22 of the internal electrodes 20A and 20B and extending along the end surfaces 12*a* and 12*b* between the end portions 24*a* and 24*b* of the through conductors 24 of the internal electrodes 20A and 20B may be provided. Each of the auxiliary conductors 29 extends along the stacking direction of the element body 12 and has, for example, a prismatic shape.

What is claimed is:

1. A multi-layer inductor comprising:

an element body including a plurality of magnetic material layers stacked and having a pair of end surfaces facing each other;

an internal electrode provided in the element body and extending between the pair of end surfaces; and a pair of external electrodes respectively provided on the end surfaces of the element body and connected to the internal electrode exposed on the end surfaces, wherein the internal electrode includes:

a plurality of through conductors extending between the end surfaces along a direction in which the pair of end surfaces face each other and having end portions exposed at the end surfaces; and a pair of auxiliary conductors each extending between ends of at least one pair of the plurality of through conductors, each of the pair of auxiliary conductors being exposed at the pair of the end surfaces.

2. The multi-layer inductor according to claim 1, wherein the internal electrode is located in one interlayer of the plurality of magnetic material layers.

3. The multi-layer inductor according to claim 1, wherein the internal electrode is located in a plurality of interlayers of the plurality of magnetic material layers.

4. The multi-layer inductor according to claim 3, wherein the plurality of through conductors include a pair of through conductors arranged along a stacking direction of the element body.

5. The multi-layer inductor according to claim 3, wherein the plurality of through conductors include:

a first through conductor and a second through conductor located in the same interlayer of the plurality of magnetic material layers; and a third through conductor and a fourth through conductor located in the same interlayer different from the interlayer in which the first through conductor and the second through conductor are located and aligned with the first through conductor and the second through conductor, respectively, in the stacking direction of the element body.

6. The multi-layer inductor according to claim 1, wherein a length of each auxiliary conductor in a first direction orthogonal to a stacking direction of the element body and a facing direction of the pair of end surfaces are 20 to 50% of a length of the element body in the first direction.

7. The multi-layer inductor according to claim 1, wherein a length of each auxiliary conductor in a second direction parallel to a direction in which the pair of end surfaces face each other are 2% to 20% of a length of the element body in the second direction.

* * * * *